United States Patent [19]

Andru

[11] Patent Number: 4,999,503
[45] Date of Patent: Mar. 12, 1991

[54] OPEN-TYPE PASSIVE RADIATION DETECTOR

[75] Inventor: Jean Antoine A. Andru, Maisons Alford, France

[73] Assignee: Eastman Kodak Company, Rochester, N.Y.

[21] Appl. No.: 346,195

[22] Filed: May 2, 1989

[30] Foreign Application Priority Data

Jul. 6, 1988 [FR] France ............................. 88 09429

[51] Int. Cl.⁵ .............................................. G01T 1/04
[52] U.S. Cl. .............................. 250/472.1; 250/482.1; 250/255
[58] Field of Search .................. 250/475.2, 472.1, 482, 250/486.1, 484.1 A, 337, 522.1; 378/88, 189, 204, 210; 16/221, 224, 235, 227

[56] References Cited

U.S. PATENT DOCUMENTS

| | | | |
|---|---|---|---|
| 2,886,711 | 5/1959 | Dybvig et al. | 250/482.1 |
| 3,476,466 | 11/1969 | Hopkins | 16/224 |
| 3,786,254 | 1/1974 | Yamashita et al. | 250/71 R |
| 3,922,555 | 11/1975 | Chapuis et al. | 250/472.1 |
| 4,056,729 | 11/1977 | Collica et al. | 250/472.1 |
| 4,388,523 | 7/1982 | Alter | 250/472.1 |
| 4,465,936 | 8/1984 | Ishiguro et al. | 250/484.1 |
| 4,615,120 | 10/1986 | Newman | 16/227 |
| 4,731,903 | 3/1988 | Kennedy et al. | 16/224 |

FOREIGN PATENT DOCUMENTS 0038112 2/1981 European Pat. Off. .

Primary Examiner—Janice A. Howell
Assistant Examiner—Kim-Kwok Chu
Attorney, Agent, or Firm—Robert A. Linn

[57] ABSTRACT

The present invention relates to a passive radiation detector wherein the base thereof defines a housing adapted to receive a lid thereof in closed position, the housing comprises means for articulated connection of the lid and means for immobilization of the lid in open position, and the lid comprises, on its inner face in closed position, means for holding a substrate and for exposure thereof when the lid is in open position.

The invention is particularly useful for the measurement of radiation in buildings.

10 Claims, 3 Drawing Sheets

OPEN-TYPE PASSIVE RADIATION DETECTOR

FIELD OF THE INVENTION

The present invention relates to the detection of radiation of any type, and more particularly, to means employed to assess the magnitude thereof and consequently its impact on day-to-day living.

The invention is more particularly directed towards the detection of alpha radiation, of natural or artificial origin, capable of being imposed near high-risk premises or sites, such as certain industrial premises in which a generation of such radiation may follow from the presence of materials or the execution of various processes. This invention also provides a detector capable of being used individually and/or in a home, to assess the presence and/or magnitude of radiation imposed on human beings or animals in day-to-day living.

RELATED ART

Various detectors have been proposed. One type of detector, known as the active type, is described in U.S. Pat. No. 3,922,555. This type of detector includes a drive member capable of creating circulation of a fluid stream from an outside medium in the direction of a detection cartridge.

A second type of detector is that known as the passive type and comprises a support on which is coated a sensitive element capable of being exposed to a source of potential radiation.

This latter type includes those described in U.S. Pat. No. 4,338,523 and concerns a rupturable envelope containing a sensitive element adapted to be exposed through a window.

Such a proposition, which is interesting in principle, presents certain drawbacks, particularly its structural fragility and the difficulty of avoiding, during storage, transport or exposure, the risk of pollution of the sensitive element which would then be incapable of furnishing a precise image of the radiation to which it had been exposed.

U.S. Pat. No. 3,783,292 describes a devise for support and exposure of a sensitive element. However, in this structure, no arrangement has been made to ensure storage of the sensitive element nor is there described the possibility of transfer or of transport of the sensitive element between a site of use and a site of examination, analysis or measurement.

European Patent Application No. 108,956 describes a passive detector, of the closed type, comprising a box constituted by a base associated with a lid and adapted to support a sensitive element having to be exposed. The described structure provides for a particular space requirement and suffers difficulties of storage and of transport due to its shape. Moreover, the sensitive element must be inserted into or extracted by hand from the box formed by the base and the lid. The user is thus obliged to make manipulations of loading and unloading, and also of packing, when the sample has to be transported to a laboratory for analysis.

All these manipulations present risks of pollution of the sample or of the sensitive element which could therefore no longer provide a precise indication of the radiation imposed thereon.

Furthermore, use of detectors as described requires the availability to the user of a safe means of transfer to a laboratory in order to convey the exposed sensitive element thereto.

SUMMARY OF THE INVENTION

The present invention provides a passive radiation detector, of open type, particularly designed to overcome the drawbacks set forth hereinabove and constitutes an apparatus of small dimensions, capable of ensuring efficient protection of the sensitive element during the periods of effective non-use following manufacture, i.e. storage, transport and distribution.

It is an object of the invention to provide a passive radiation detector capable of performing per se a first function of protection of a sensitive element and secondly exposure of this element in period of use in a position stable in time and a possibly adjustable orientation, without obliging the user to employ specific means to such ends.

Another object of the invention is a passive radiation detector presenting the advantage of allowing the user to send or directly convey, in complete safety, the sensitive element to a laboratory for processing or measuring, without risk of pollution or degradation capable of altering the damage tracks pattern that it bears as the result of original exposure.

It is a further object of the invention to provide a passive detector of low cost, allowing unitary manufacture, in mass-production, of an article to be used once only.

The passive detector according to the invention is characterized in that:

the base defines a housing for receiving the lid in closed position;

the housing comprises means for articulated connection of the lid and means for immobilizing the lid in open position;

and the lid comprises, on its inner face in closed position, means ensuring holding of the substrate and exposure thereof in open position of said lid.

Various other features will be apparent from the description given hereinbelow with reference to the accompanying drawings which show, by way of non-limiting examples, embodiments of the object of the invention.

BRIEF DESCRIPTION OF THE DRAWINGS

FIG. 5 is a perspective view illustrating another element constituting the object of the invention.

DESCRIPTION OF PREFERRED EMBODIMENTS

Figure 1:
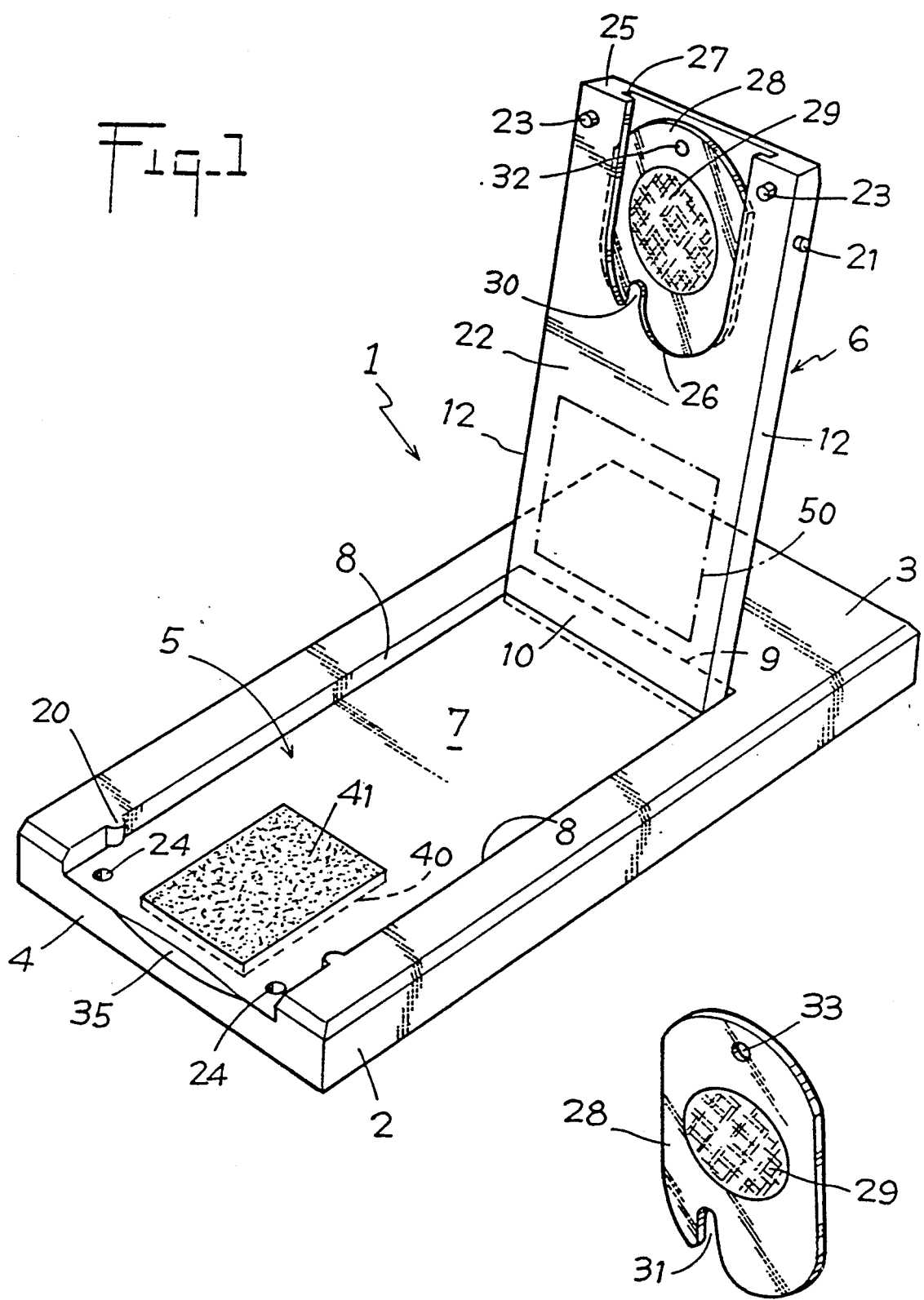
FIG. 1 is a view in perspective illustrating the passive radiation detector in a characteristic position of use.

According to the first embodiment, illustrated in FIG. 1, the passive radiation detector is in the form of a flat box 1 presenting, in plan, a square or rectangular shape. It must be considered that this shape in plan is not limiting and that the box may take other forms in plan, such as circular, polygonal, regular or irregular.

The box 1 comprises a base 2, preferably but not exclusively made of a plastic material chosen as a function of its compatibility with the radiation having to be detected. The choice of this raw material, whether it be synthetic or natural, therefore depends solely on the application envisaged and does not come directly within the subject matter of the invention, being given that such a choice may be considered as depending on the technique within the scope of the man skilled in the art in question.

The base 2 defines, from its upper surface 3 and one of its sides, such as 4, when it is polygonal in plan, a housing 5 adapted to receive a lid 6. The shape of the housing 5 is complementary of the lid 6 and, by way of example, takes the form of a parallelepipedic hollow comprising a bottom 7, two longitudinal sides 8 parallel to each other and a transverse side 9, preferably parallel to edge 4 at the level of which the housing 5 opens. The lid 6 consequently presents a complementary shape and is in the form of a plate whose dimensions and thickness are determined, to within the clearance, for such a lid to be totally fitted in the housing 5. In the same manner as before, housing 5 and lid 6 may take in plan, and even in volume, any other shape deemed acceptable for the function having to be performed.

The lid 6 presents, in the vicinity of its foot 10, means adapted to cooperate with complementary means presented by housing 5 to ensure articulated connection of the lid 6 on the base 2. The articulated connection must enable the lid to occupy, on the one hand, either a closed position, as illustrated in FIG. 3, in which it is disposed completely in housing 5, or an open position, as illustrated in FIG. 4, and, on the other hand, a table immobilization in this open position.

Figure 2:
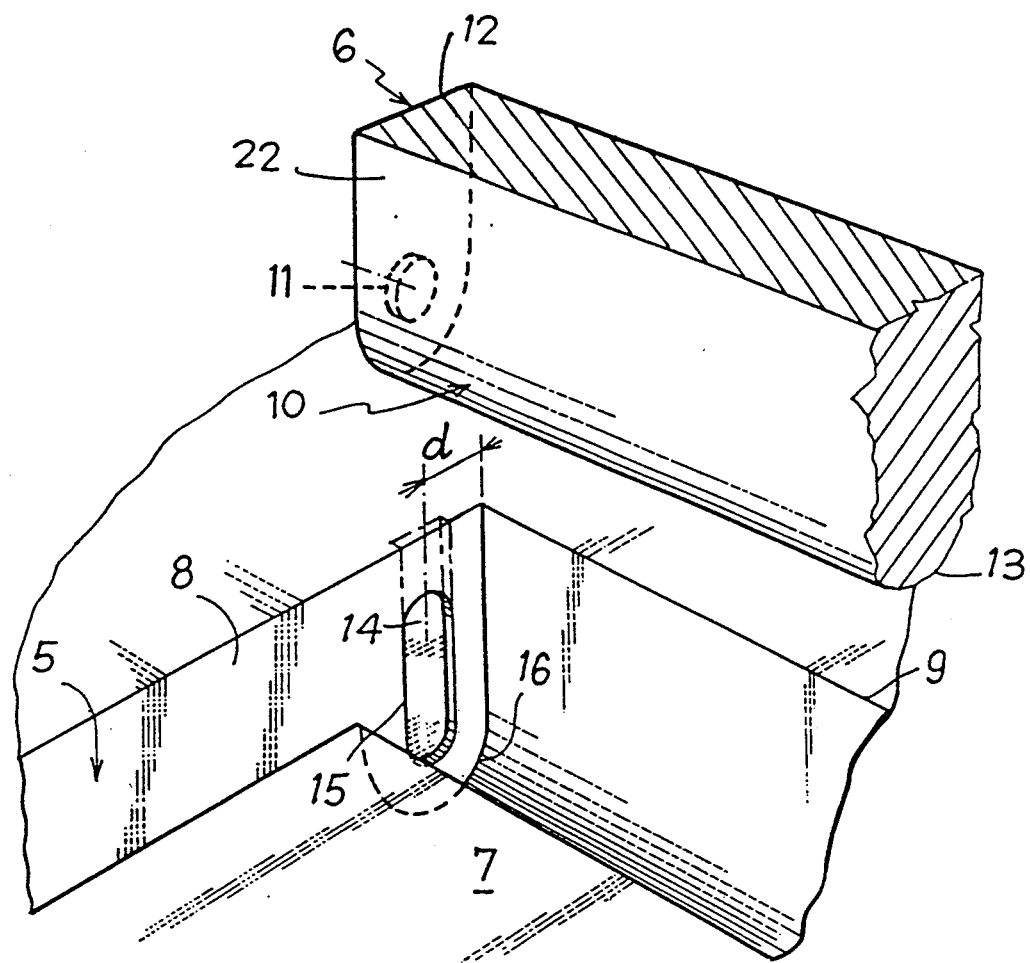
FIG. 2 is a perspective view, with parts torn away, showing, in exploded form, certain of the elements constituting the object of the invention.

The articulated connection means, as illustrated in FIG. 2, firstly comprise journals 11 which project from the longitudinal sides 12 of the lid 6. These journals 11, arranged coaxially, are also concentric to a semi-cylindrical configuration 13 given to foot 10. The articulated connection means also comprise, near the transverse side 9 and in the longitudinal edges 8 of the housing 5, bearings 14 adapted to receive the journals 11 by simple elastic deformation. However, it may be envisaged to extend the bearings, as shown in chain-dotted lines, so that they open out on the upper surface 3, with a view to facilitating insertion of the journals 11 for assembling the lid 6.

Figure 3:
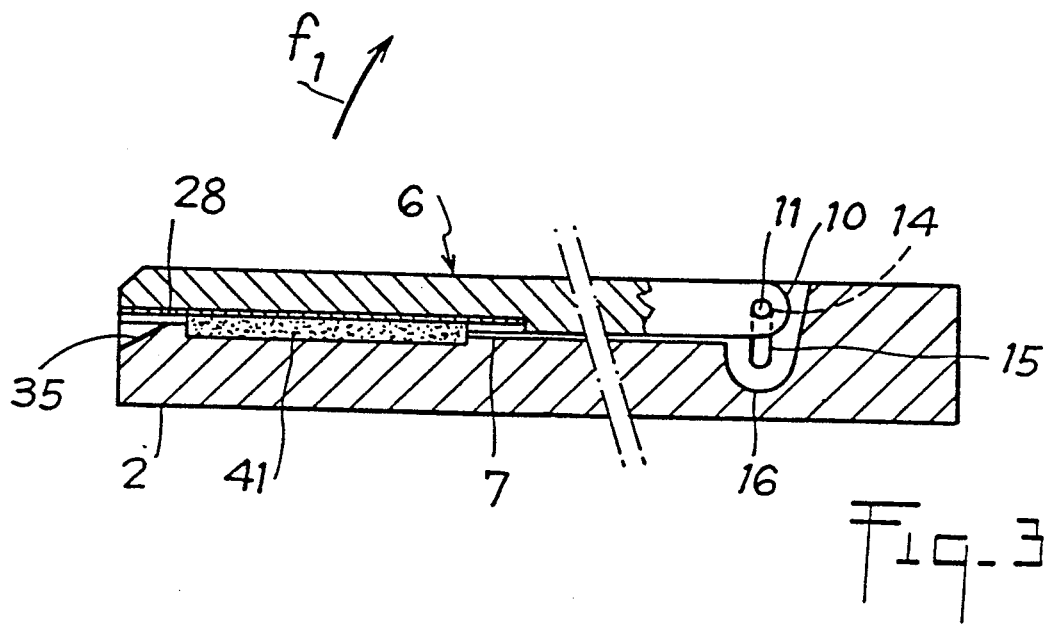
FIGS. 3 and 4 are partial transverse sections illustrating two characteristic positions concerning different technical means of the object of the invention.
Figure 4:
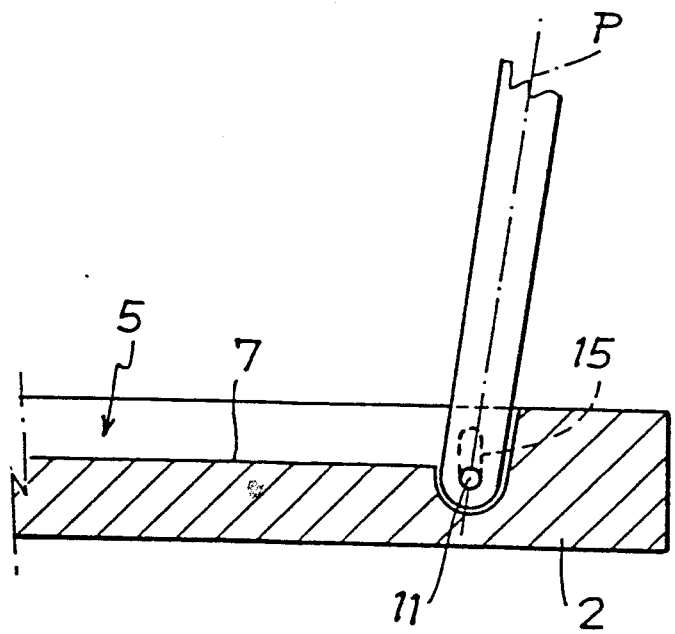

The journals 11 and bearings 14 define, in this manner, a geometrical axis of articulation enabling the lid 6 to pivot from the position of FIG. 3 to the position of FIG. 4, and vice versa.

It must be considered that any means, technically adapted to perform such a function, may replace the journals 11 and bearings 14.

The articulated connection means provided according to the invention must preferably also be capable of ensuring a dismountable articulated connection in order to allow easy and practical separation of the foot 10 from the base 2, for reasons which will be apparent hereinbelow.

The means adapted to ensure immobilization of the lid 6 in a stable open position may employ, between the axis of the bearings 14 and the side 9, a distance d greater than the thickness of the lid 6, so that, after pivoting in the direction of open position according to FIG. 4, said open position is attained by abutment against the side 9 in an inclination greater than 90°, if the plan of the upper face 3 with the median plan such as p, of the lid 6 is considered.

These means may also take the form of deformable bosses or beads adapted to cooperate with the base 2 to avoid accidental closure of the lid 6. Bosses similar to catches 21 may for example be disposed on the longitudinal sides 12 of the lid in the vicinity of the articulation. These bosses, cooperating with the top 3 and the edge 8 of the base 2, will offer a resistance to accidental closure of the lid 6.

Other technical means may be retained for attaining the same purpose. According to FIGS. 2 to 4, such means may consist in making bearings 14 in the form of oblong grooves 15 ending, by their lower semi-cylindrical clearance 16 for fit made in the extension of side 9, from the bottom 7 of the housing 5.

Such means make it possible to maintain the lid 6 in the closed position of FIG. 3 and to contribute to immobilization in open position according to FIG. 4 after opening and pivoting about the axis defined by journals 11.

In fact, as lid 6 opens in the direction of arrow $f_1$, it rotates, via journals, in bearings 14 and simultaneously slides in the oblong grooves 15 which guide the foot 10 to fit in clearance 16. In this position, the lid 6 may or may not abut on the edge 9 to occupy a stable position corresponding to an angular opening close to 90°.

Means for immobilizing the lid 6 in the closed position of FIG. 3, are provided between this lid and the housing 5. Such mean may for example be constituted by bosses 20 projecting from the longitudinal edges 8 of the housing 5, so as to cooperate with the longitudinal sides 12 of the lid 6. It may also be provided to replace the bosses 20 by catches 21 projecting from the longitudinal edges 12. It may also be envisaged to mould on the face 22 of the lid 6, called inner face with reference to the closed position of FIG. 3, projections 23 adapted to clip by pressure in holes 24 make in the bottom of the housing 5.

The lid 6 presents, from its inner face 22 and transverse top edge 25, an exposure window 26 combined with a slideway 27 made in the thickness of the lid 6. The exposure window 26 and the slideway are adapted for the insertion and presentation of a sensitive radiation element 28 i.e. "sensitive element" which may be made in different appropriate and possible ways, as a function of the radiation having to be detected. By way of example, the sensitive element may be in the form of a substrate, such as a film, on which one of the faces bears a sensitive layer 29 whose composition is chosen as a function of the radiation to be detected.

The sensitive element 28 may thus be slidably inserted inside the slideway 27, to the bottom thereof, so that the sensitive layer 29 is visible through the window 26 which allows exposure thereof.

If the sensitive element 28 presents only one active face, it is advantageous to provide, in the configuration of the window 26, a polarization catch 30 or the like, offset with respect to the longitudinal median axis of the window to cooperate with a complementary notch 31 made on the peripheral edge of the sensitive element 28 (FIG. 5). Such means allow only one orientation of presentation and ensure that the sensitive layer 29 will always be suitably oriented facing the window 26 in the direction of the inner face 22.

In order to ensure correct immobilization of the sensitive element 28, a catch 32 or the like may be provided on the bottom of the slideway 27 near the top edge 25, adapted to cooperate with a perforation 33 presented by the substrate 28.

In the position of closure of lid 6, as illustrated in FIG. 3, the sensitive element 28 is oriented opposite the bottom 7 of the housing 5 and is thus protected from the various radiations capable of reaching it. The passive detector according to the invention occupies a position of storage or of transport in which it is maintained in an inactive state.

When the passive detector is to be used, it suffices to open the lid in the direction of arrow $f_1$, pivoting it on journals 22 or the like. Opening of the lid is facilitated by providing, in the transverse edge 4, a groove 35 facilitating holding of the top edge 25.

After the lid 6 has been opened up to the stable, immobilized, open position as illustrated in FIG. 1, the sensitive layer 29 is visible through window 26 and may thus be directly exposed to the radiation having to be detected. In this state, the lid 6 and base 2 perform a function of stable display, maintaining the sensitive element 28 in a state favorable for exposure to the radiation.

After the necessary exposure time, the lid 6 may be detached from the base 1 and be inserted in an envelope made of plastics material for transport thereof to a laboratory for development or processing. It should be noted that this envelope may easily be sent by post, due to the small dimensions of the lid 6 and its low weight, enabling it to be sent at a minimum rate.

This easy detachment avoids the user having to remove the sensitive element 28 for transport thereof and consequently avoids any risk of deterioration or pollution of the sensitive layer 29 prior to processing thereof.

The particular structure of the detector enables it to be mass-produced from plastics material by injection moulding, leading to a low unitary cost. It therefore becomes possible to produce the detector in the form of a single-use detection apparatus, releasing the user from the servitude of unloading and reloading the sensitive element 28.

FIG. 1 shows that it is particularly advantageous to arrange in the bottom 7 of the housing 5 a cavity 40 adapted to receive a pad 41 of supple material, preferably of the foam type, and more especially with closed cells. The pad 41 presents dimensions compatible with the exposure window 26, is located by the position of the cavity 40, in register with the window 26, in the closed position of the lid 6 and presents a very slight excess thickness with respect to the bottom 7. In this way, as shown in FIG. 3, in the closed position of lid 6, the sensitive element 28 is applied on the pad 41 which protects it from mechanical or chemical damage or from radiations which might alter or pollute the sensitive layer 29 during the phases of transport, handling or during storage in a store.

FIG. 1 shows that it is also advantageous to provide on the inner face 22 of the lid 6 an area 50 reserved for marking signs or indications for identification, either of the detector as such or of the characteristics of the sensitive element, such as composition, sensitivity, etc.. This area 50 may be adapted in any appropriate manner to allow direct marking or to receive a removable, for example adhesive, support, which may be added if necessary.

Figure 6:
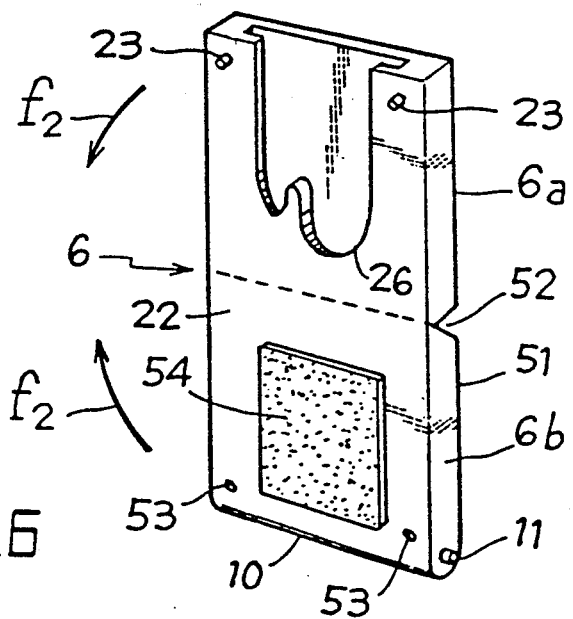
FIG. 6 is a perspective view showing a variant embodiment of one of the elements constituting the invention.

FIG. 6 shows a variant embodiment in which the lid 6 is provided to comprise, from its outer surface 51 a median transverse zone of fold 52. Such a zone divides the lid 6 into two parts 6a and 6b which may be folded on each other by pivoting, in the directions of arrows $f_2$, about the line of articulation defined by zone 52. In such a case, catches 23 may then cooperate with holes 53 which are made in register in part 6b in the vicinity of foot 10.

This arrangement makes it possible to close and fold the lid 6 on itself in order to protect the sensitive layer 29 during transport to a laboratory for processing.

In such an embodiment, it is also advantageous to provide in the inner face 22 a cavity adapted to receive a protecting pad 54, of the same type as pad 41. Such a pad occupies a symmetrical position with respect to the window 26, in consideration of the zone of fold 52, and presents dimensions compatible with its partial insertion into window 26.

This invention has ben described in detail with particular reference to preferred embodiments thereof, but it will be understood that variations and modifications can be effected with the spirit and scope of the invention.

What is claimed is:

1. A passive radiation detector comprising a box (1) formed by a base (2) provided with a lid (6) and supporting a removable substrate (28) coated, on at least one face, with a layer (29) sensitive to the radiation to be detected wherein:

the base (2) defines a housing (5) for receiving the lid in closed position, the housing comprises means (11, 14) for articulated connection of the lid and means (20) for immobilizing this lid in open position, and the lid comprises, on its inner face (22) in closed position, means (26, 27) ensuring holding of the substrate and exposure thereof in open position of said lid.

2. The radiation detector according to claim 1 wherein the means for articulated connection of the lid are designed to allow dismountability of the latter with respect to the base.

3. The radiation detector according to claim 2 wherein the articulated connection means and the immobilization means comprise journals (11) for pivoting formed at the foot (10) by edges (12) of the lid and adapted to cooperate with bearings (14) made in the opposite edges (8) of the housing (5) at a distance (d) from the corresponding transverse edge of the housing, chosen to give the lid an open position at an angle greater than 90° with respect to the base.

4. The radiation detector according to claim 3 wherein the bearings (14) are formed by oblong grooves (15) of vertical direction aligned with the median vertical plane of a clearance (16) made in the bottom of the housing to allow fit of the foot (10) of the lid in open position.

5. The radiation detector according to claim 1 wherein the bottom (7) of the housing bears a pad (41) on which the substrate is applied when the lid is in closed position.

6. The radiation detector according to claim 1 wherein the means ensuring holding and exposure of the substrate comprise a slideway (27) for insertion made in relation with an exposure window (26) opening on the inner face (22) of the lid.

7. The radiation detector according to claim 1 wherein the holding and exposure means comprise at least one polarization member (30).

8. The radiation detector according to claim 1 wherein means for immobilization in closed position are provided between the lid and the housing in the base.

9. The radiation detector according to claim 1 wherein the lid comprises:
 a transverse zone of fold (52) dividing it into two parts (6a-6b),
 a pad (54) borne by inner face (22) symmetrically to the exposure window with respect to the line of fold, and
 means (23, 53) for locking the two parts of the lid in closed position.

10. The radiation detector according to claim 1 wherein the inner face of the lid comprises an area (50) for marking and identification.

* * * * *